United States Patent [19]

Matsumoto

[11] Patent Number: 5,036,723
[45] Date of Patent: Aug. 6, 1991

[54] MOVABLE TABLE

[75] Inventor: Hiroshi Matsumoto, Iwata, Japan

[73] Assignee: NTN Corporation, Osaka, Japan

[21] Appl. No.: 549,836

[22] Filed: Jul. 9, 1990

[30] Foreign Application Priority Data

Feb. 28, 1990 [JP] Japan .................................. 2-20251

[51] Int. Cl.⁵ ............................................ G05G 11/00
[52] U.S. Cl. ...................................... 74/479; 108/137; 248/660
[58] Field of Search .......................... 74/479; 108/137; 33/1 M; 248/660; 269/71; 250/440.1, 442.1

[56] References Cited

U.S. PATENT DOCUMENTS 3,626,769 12/1971 Hecker et al. ..................... 74/479 X

FOREIGN PATENT DOCUMENTS 1-233606 9/1989 Japan ..................................... 74/479

Primary Examiner—Allan D. Herrmann
Assistant Examiner—David W. Laub
Attorney, Agent, or Firm—Armstrong, Nikaido, Marmelstein, Kubovcik, & Murray

[57] ABSTRACT

A movable table has a fixed platen, a movable platen, a plurality of balls for supporting the movable platen over the fixed platen, a retainer provided between the fixed platen and the movable platen for retaining the balls, and a restrictor for restricting the movement of the retainer. The movable platen is moved in one direction by at least two first driving assemblies and is moved in a direction perpendicular to the above direction by a second driving assembly. The first and second driving assemblies are coupled to the movable platen so as to be pivotable and slidable in a direction perpendicular to the direction in which is moves the movable platen.

1 Claim, 4 Drawing Sheets

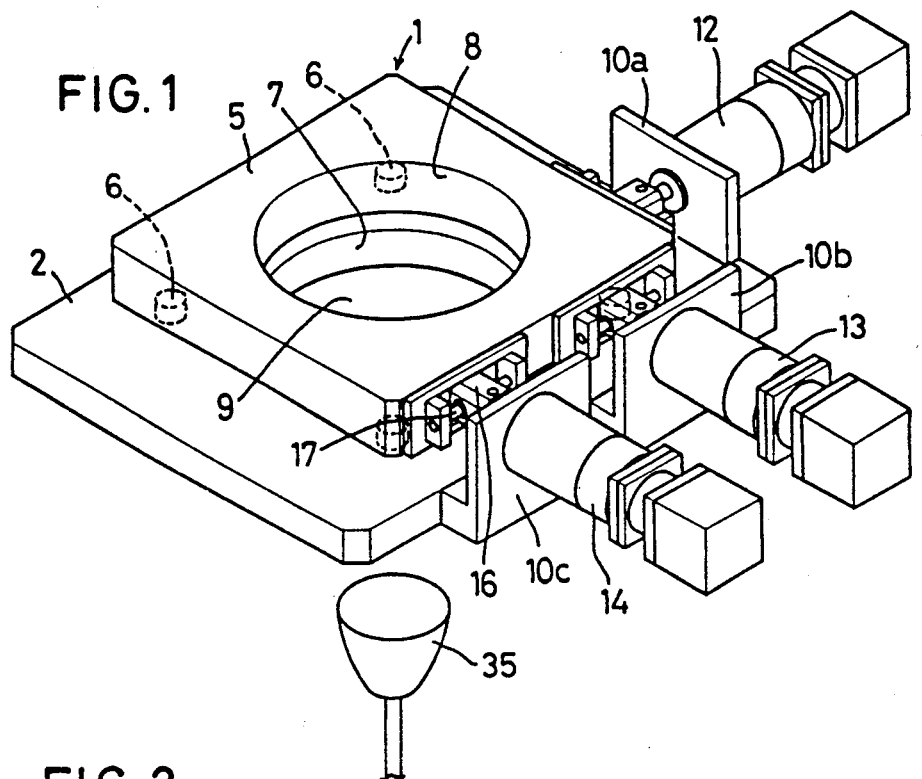
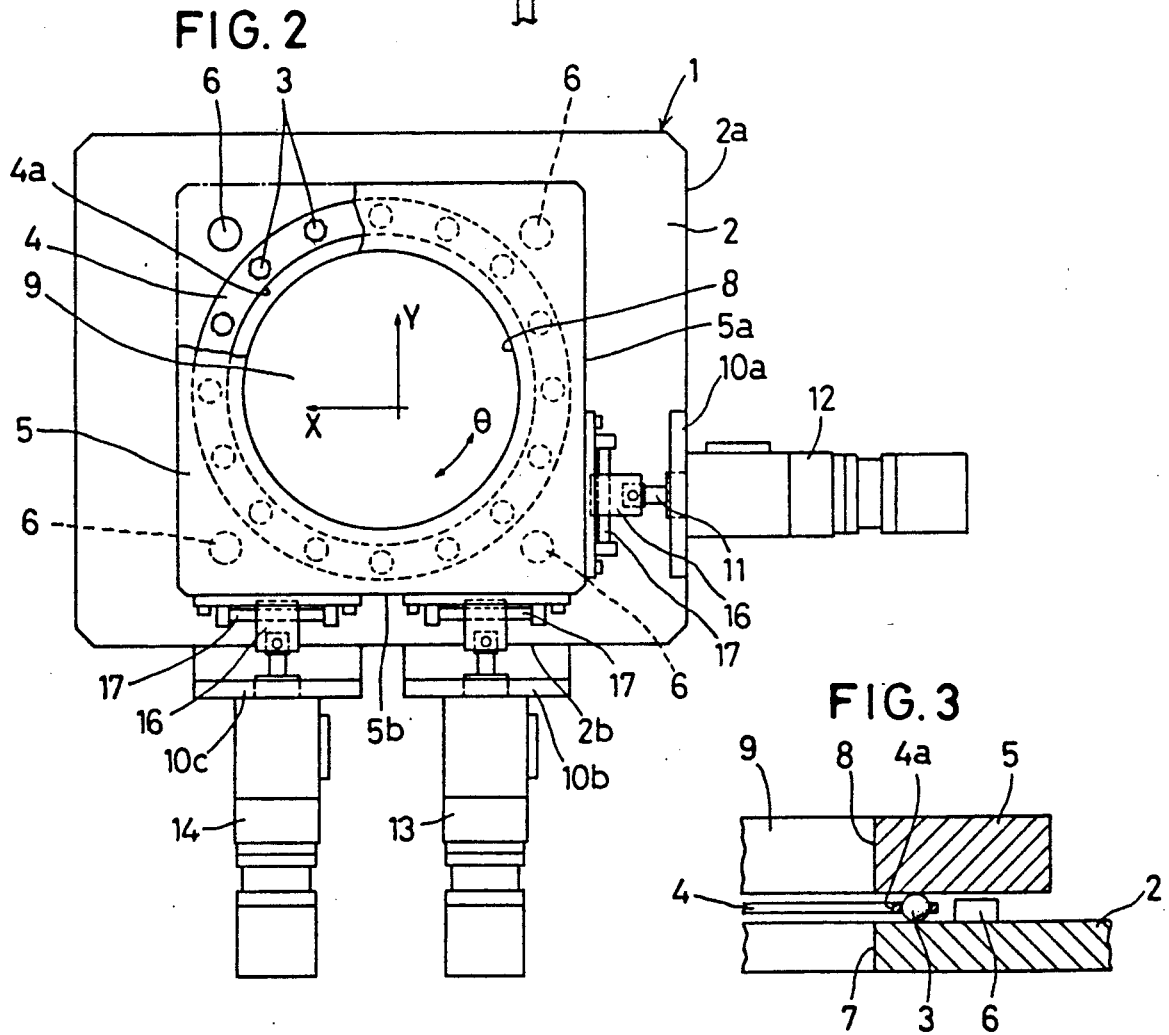

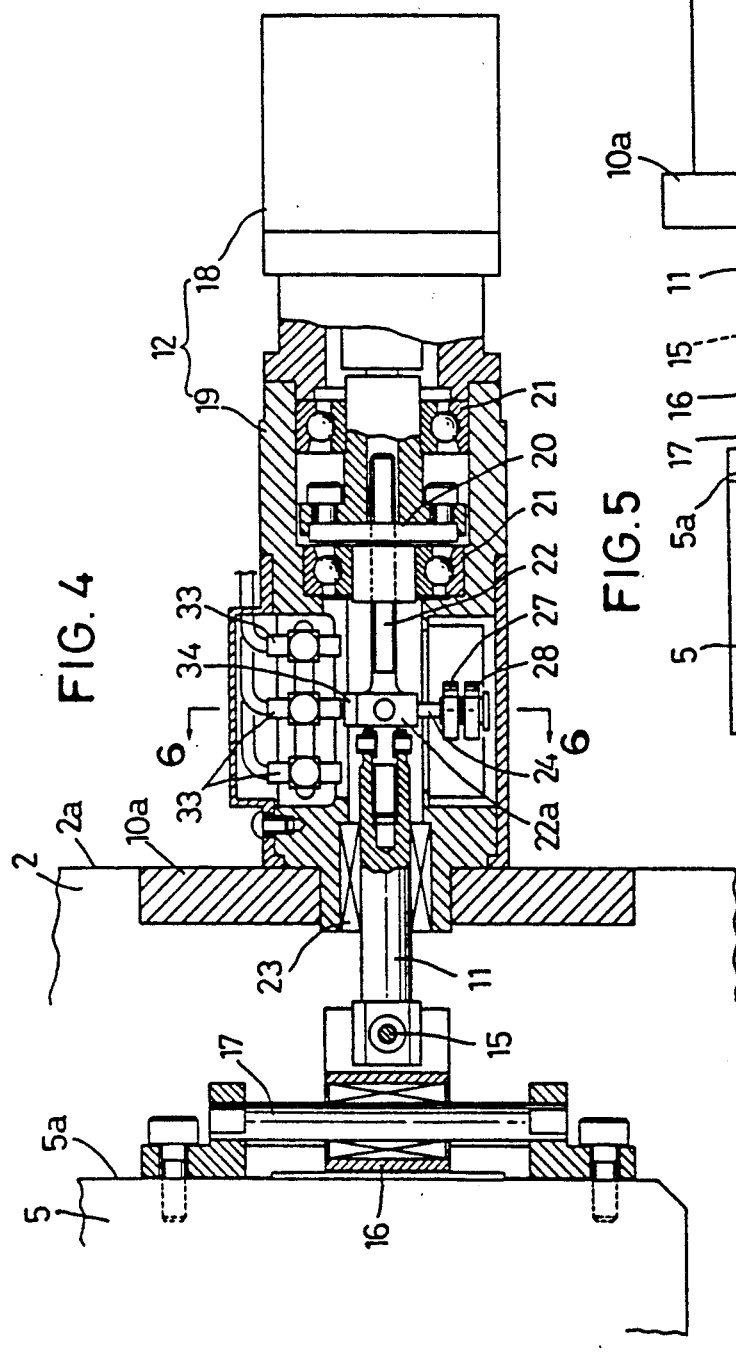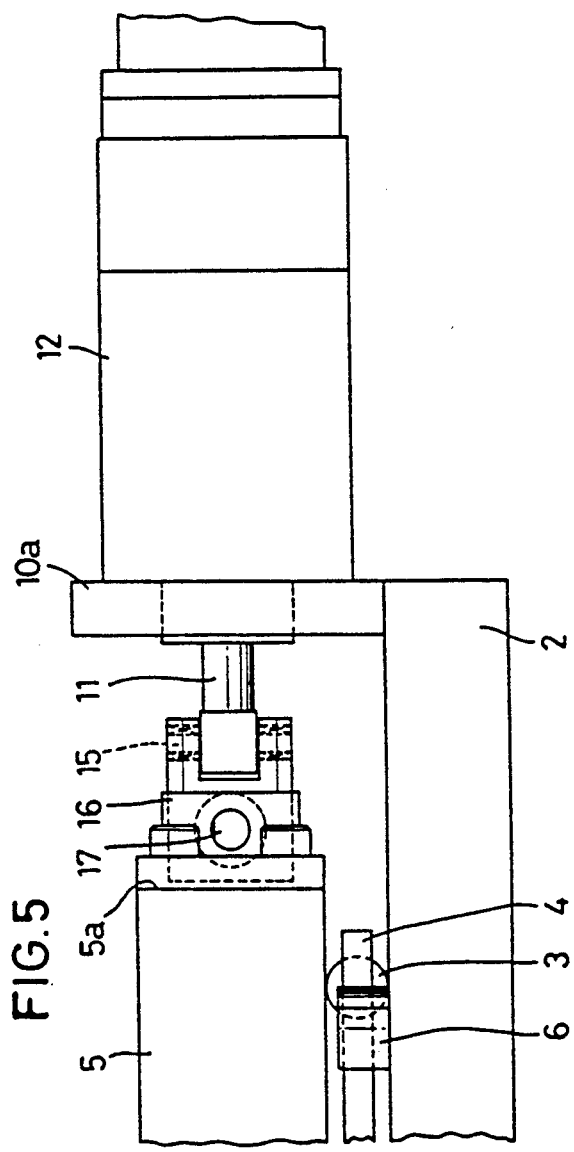
FIG. 4
FIG. 5

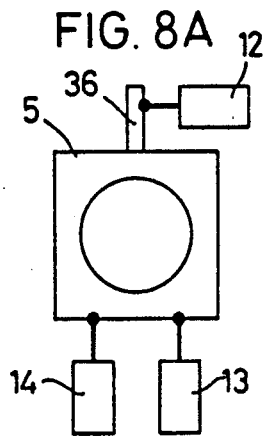
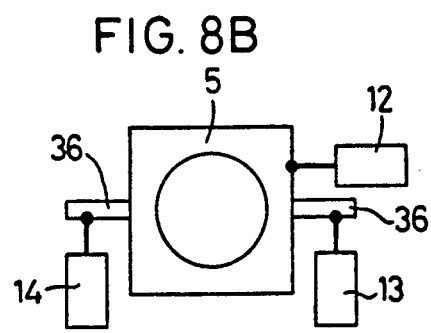
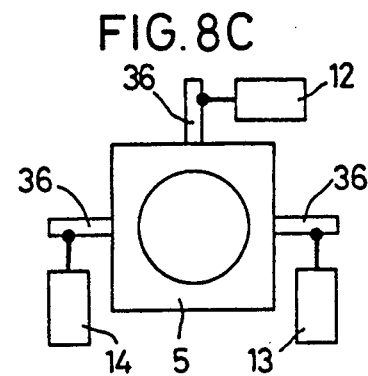
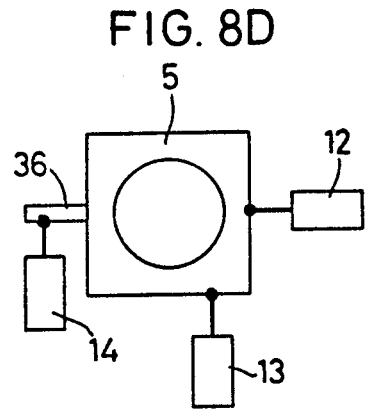
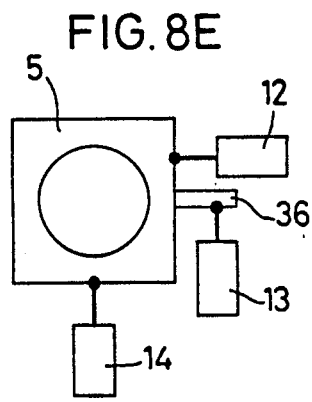
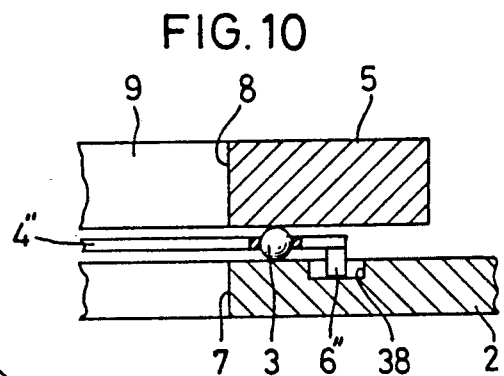
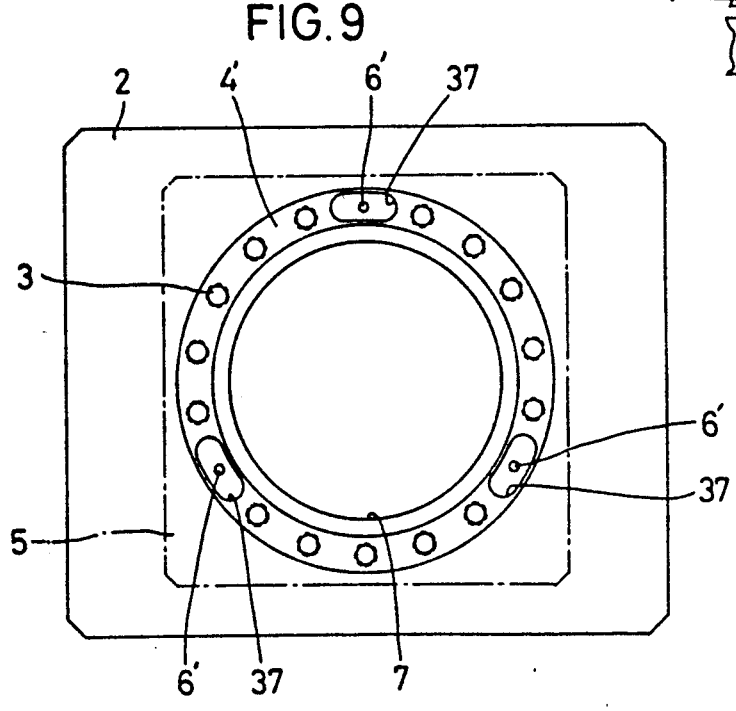

MOVABLE TABLE

This invention relates to a movable table capable of moving in a straight line in two directions perpendicular to each other and making a pivotal motion.

A tape exposure device for exposing a wiring pattern of an LSI chip or the like on a tape, a display detector for examining defects in liquid crystals and the like require a movable table as a working table capable of moving in two directions perpendicular to each other and being pivotable by any desired angle.

In the prior art, a movable table having two tables with a built-in driving mechanism such as ball threaded shafts are placed one upon the other. In order to give this assembly a pivotal function, it is necessary to mount these two tables on a rotary table having an indexing function. This complicates the structure and increase the height of the table and the entire size of the assembly.

With the above-described exposure device, it is necessary to provide a working table with an irradiating hole through which light can be applied to a specimen. But, the prior art table, having a plurality of tables placed one upon another, it is difficult to provide a light-passing hole in a desired position of the table. Especially if the table is mounted on a rotary table, it is extremely difficult to form a light-passing hole through the entire movable table.

It is an object of the present invention to provide a movable table which is simple in structure and compact in size, which is capable of moving in two directions perpendicular to each other as well as a pivotal motion, and in which it is easy to form a light-passing hole therethrough.

In accordance with the present invention, there is provided a movable table comprising a fixed platen, a movable platen, a plurality of balls for supporting the movable platen over the fixed platen, a retainer provided between the fixed platen and the movable platen for retaining the balls, means for restricting the movement of the retainer, at least two first driving means having their axes parallel to each other for moving the movable platen in one direction, and a second driving means for moving the movable platen in a direction perpendicular to the one direction, the first and second driving means being coupled to the movable platen so that the movable platen will be turnable in a plane parallel to the fixed platen and slidable in a direction perpendicular to the direction in which the movable platen is moved.

According to the present invention, the movable platen is movable in every direction guided by the balls rollable on a fixed platen.

In this state, by means of the first or second driving means coupled to the movable platen, the movable platen can be moved in two directions perpendicular to each other.

By moving all the driving assemblies all at once, the movable platen can be turned about any desired point or can be moved in any desired direction on a rectangular coordinate.

In this arrangement, because only the retainer for the balls is interposed between the fixed platen and the movable platen, the height of the table can be kept minimum.

By forming a through hole in the center of the retainer so as to correspond to the holes formed in the fixed platen and the movable platen, a light-passing hole is formed through the table.

According to the present invention, the movable platen is supported on the fixed platen through a plurality of balls. A plurality of driving assemblies adapted to expand and shrink in parallel with each other and a driving assembly perpendicular thereto are coupled to the movable platen. This makes it possible to reduce the height of the table compared with a conventional structure in which a plurality of tables are put one upon another. Thus it is possible to provide a movable table which is compact in size and which can be moved in two directions perpendicular to each other and is capable of pivotal movement.

Also, because no obstacle such as a ball threaded shaft is disposed between the fixed platen and the movable platen, a light path can be formed through the table by forming center holes in the platens and the retainer.

Other features and objects of the present invention will become apparent from the following description taken with reference to the accompanying drawings, in which:

FIG. 1 is a perspective view of the movable table embodying the present invention;

FIG. 2 is a partially cutaway plan view of a portion of the same;

FIG. 3 is a sectional view of a portion of the same;

FIG. 4 is a partially vertical sectional plan view of the ball threaded shaft and its coupling portion;

FIG. 5 is a side view of the same;

Figure 6:
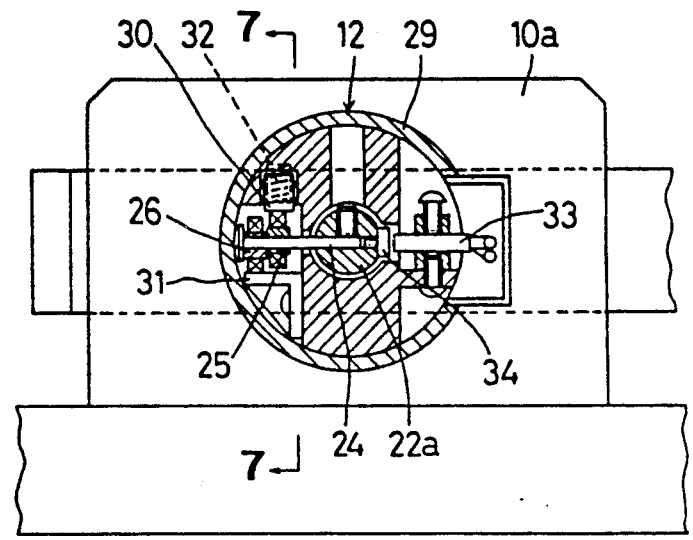
FIG. 6 is a sectional view taken along line 6—6 of FIG. 4.

FIGS. 8(a) to 8(e) are schematic views showing how the ball threaded shaft assemblies are coupled to the movable platen;

FIG. 9 is a plan view of the restricting means for the retainer; and

FIG. 10 is a sectional view of another example of the restricting means for the retainer.

FIGS. 1-10 show a preferred embodiment. First referring to FIGS. 1-3, a ring-shaped retainer 4 having a plurality of balls 3 adapted to roll along the peripheral surface thereof is mounted on a fixed platen 2. A movable platen 5 is supported on the balls 3 in the retainer 4.

In this state, the movable platen 5 is movable in any direction guided by the balls 3 which roll freely on the fixed platen 2. Stopper pins 6 are provided on the top surface of the fixed platen 2 at its four corners to restrict the movement of retainer 4 adapted to move as the balls 3 roll within a predetermined range.

The fixed platen 2 and the movable platen 5 are formed in the center thereof with round holes 7 and 8, respectively. These holes and a center hole 4a formed in the retainer define a hole 9 for passing light vertically through the movable table. The center hole 4a in the retainer 4 is larger in diameter than the round hole 7 in the fixed platen 2 so that the edge of the cage 4 will not protrude into the round hole 7, but is small enough for the stopper pins 6 to restrict the movement of the retainer.

A support plate 10a is secured to one side 2a of the fixed platen 2 whereas two support plates 10b and 10c are secured with a predetermined spacing from each other to a side 2b adjacent to the side 2a. Ball threaded shaft assemblies 12, 13 and 14 each having a connecting shaft 11 are secured to the respective support plates 10a, 10b and 10c, respectively.

As shown in FIGS. 4 and 5, the connecting shaft 11 of each of the ball threaded shaft assemblies 12–14 has its end pivotally connected to a slider 16 through a pin 15. The slider 16 is movably mounted on a horizontally-extending guide rod 17 provided on each of adjacent sides 5a and 5b of the movable platen 5. The slider 16 and the pin 15 allow each connecting shaft 11 to pivot and slide with respect to each side.

As shown in FIG. 4, each ball threaded shaft assembly comprises a driving unit 18 for generating a turning torque and a transmission unit 19 for transmitting the torque to the connecting shaft 11.

The threaded shaft nut 20 is rotatably mounted in the transmission unit 19 through bearings 21. The threaded shaft nut 20 and the connecting shaft 11 are coupled together by a ball threaded shaft 22 having one end thereof screwed into the nut 20 and the other end screwed into the shaft 11. The connecting shaft 11 is axially movably mounted through a slide bearing 23.

Figure 7:
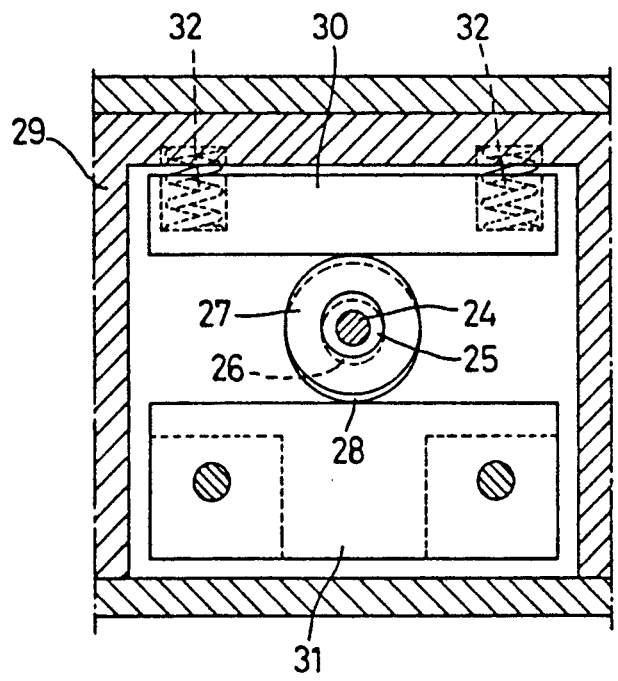
FIG. 7 is a sectional view taken along line 7—7 of FIG. 6.

As shown in FIGS. 6 and 7, the ball threaded shaft 22 is provided on its large-diameter portion 22a with a turn-restricting pin 24 which is provided with two eccentric rings 25 and 26 to prevent the ball threaded shaft 22 from turning. The eccentric rings 25 and 26 have bearings 27 and 28 fitted thereon, respectively. The bearings 27, 28 have their peripheral surfaces in rolling contact with a pressurization block 30 and a rolling block 31 provided at one side of a housing 29. The pressurization block 30 is biased by resilient springs 32 toward the fixed rolling block 31. The ball threaded shaft 22 is prevented from turning and is moved axially in a straight line by the guiding effect of the blocks 30 and 31 and the eccentric action of the eccentric rings 25 and 26.

On the other hand, a plurality of position detecting sensors 33 are provided in the housing 29 at the side opposite to the pin 24 to detect the position of the ball threaded shaft 22. Opposite to them, a sensor metallic portion 34 is mounted on the large-diameter portion 22a of the ball threaded shaft 22.

Though not shown, the driving unit 18 comprises a motor for imparting a torque to the threaded shaft nut 20 and a position controller for controlling the relative rotation between the motor and the threaded shaft nut 20. The position controller may be an encoder used in combination with a stepping motor or a servomotor as a driving motor. Also, it may be a linear scale used in combination with a servomotor.

To use the above-described movable table 1 as a work table for a tape exposure device or a liquid crystal display detector, as shown in FIG. 1, a light source 35 is set below the fixed platen 2 right under the round hole 7 so that the light from the light source 35 will pass through the light-passing hole 9 in the center of the platens 2 and 5.

When the driving unit 18 of each ball threaded shaft assembly is actuated to rotate the ball threaded shaft nut 20, the ball threaded shaft 22 will move straight in an axial direction, prevented from rotating by the engagement between the eccentric rings 25 and 26 and the pressurization block 30 for preload and the rolling block 31. Thus the connecting shaft 11 will move back and forth in a straight line.

In order to move the movable platen 5 in an X direction in FIG. 2, only the ball threaded shaft assembly 12 is actuated while keeping the ball threaded shaft assemblies 13 and 14 deactivated. Thus the sliders 16 coupled to the connecting shafts 11 of the ball threaded shaft assemblies 13 and 14 will slide on and along the guide rods 17, thereby allowing the movable platen 5 to move in the direction of X.

To move the movable table 5 in the direction of Y, the ball threaded shaft assemblies 13 and 14 are moved by the same distance while holding the ball threaded shaft assembly 12 at a stop.

On the other hand, to turn the movable platen 5, the ball threaded shaft assembly 14 is moved forward or backward while keeping the adjacent ball threaded shaft assembly 13 at a stop. Also the ball threaded shaft 12 positioned perpendicular to the other two is moved forward or backward as the assembly 14 moves. Thus the movable platen 5 will pivot about the coupling point of the ball threaded shaft assembly 13. The amount $\theta$ of this pivotal motion is adjustable by changing the movement of the ball threaded shaft assemblies 14 and 12. Also by moving the ball threaded shaft assemblies 12, 13, 14 all at once, the movable platen 5 can be pivoted about any desired point.

In this embodiment, the three ball threaded shaft assemblies 12–14 are directly coupled to adjacent sides of the movable platen 5. They may be coupled to the movable platen 5 in various ways as shown in FIGS. 8(a) to 8(e). In these figures, numeral 36 designates a coupling rod fixed to the movable platen 5. Each ball threaded shaft assembly is coupled to the respective coupling rod 36 so as to be pivotable and slidable in a direction parallel to the coupling 36.

In this embodiment, ball threaded shaft assemblies are used to move the movable platen 5. But other driving members such as hydraulic cylinders may be used.

Further, the stopper pins 6 for restricting the movement of the retainer may be provided inside the center hole 4a in the retainer 4. Also as shown in FIG. 9, a plurality of elongated holes 37 may be formed in the periphery of a cage 4' with a stopper pin 6' disposed in each elongated hole 37.

Further as shown in FIG. 10, a retainer 4" may be provided with stopper pins 6" adapted to engage recesses 38 formed in the fixed platen 2 to restrict the movement of the retainer.

What is claimed is:

1. A movable table comprising a fixed platen, a movable platen, a plurality of balls for supporting said movable platen for movement over said fixed platen, a retainer between said fixed platen and said movable platen for retaining said balls, means for restricting movement of said retainer between said platens, at least two first driving means having driving axes parallel to each other for moving said movable platen in one direction, and a second driving means for moving said movable platen in a second direction perpendicular to said one direction, said first and second driving means being coupled to said movable platen for turning said movable platen in a plane parallel to said fixed platen.

* * * * *